United States Patent
Schulthess et al.

(10) Patent No.: US 9,902,887 B2
(45) Date of Patent: Feb. 27, 2018

(54) LATENT-REACTIVE HOT-MELT ADHESIVE COMPOSITION

(71) Applicant: COLLANO ADHESIVES AG, Sempach-Station (CH)

(72) Inventors: Adrian Schulthess, Tentlingen (CH); Hendrik Mathes, Sempach-Station (CH); Benjamin Grimminger, Bern (CH); Olaf Meincke, Bern (CH); Steffen Harling, Winterthur (CH); Giuseppe Meola, Winterthur (CH); Stefan Schaible, Kreuzlingen (CH)

(73) Assignee: Collano Adhesives AG, Sempach-Station (CH)

( * ) Notice: Subject to any disclaimer, the term of this patent is extended or adjusted under 35 U.S.C. 154(b) by 317 days.

(21) Appl. No.: 14/431,915

(22) PCT Filed: Sep. 12, 2013

(86) PCT No.: PCT/EP2013/068874
§ 371 (c)(1),
(2) Date: Mar. 27, 2015

(87) PCT Pub. No.: WO2014/048760
PCT Pub. Date: Apr. 3, 2014

(65) Prior Publication Data
US 2015/0252231 A1    Sep. 10, 2015

(30) Foreign Application Priority Data

Sep. 28, 2012   (EP) .................................... 12186693

(51) Int. Cl.
*C09J 175/12*   (2006.01)
*C08G 18/50*   (2006.01)
(Continued)

(52) U.S. Cl.
CPC ......... *C09J 175/12* (2013.01); *B29C 47/0011* (2013.01); *C08G 18/4018* (2013.01);
(Continued)

(58) Field of Classification Search
None
See application file for complete search history.

(56) References Cited

U.S. PATENT DOCUMENTS

| 4,483,974 | A | 11/1984 | Grogler et al. |
| 4,888,124 | A | 12/1989 | Blum et al. |

(Continued)

FOREIGN PATENT DOCUMENTS

| CA | 2114842 | C | * | 8/2003 | ............. C08G 18/10 |
| DE | 32 30 757 | A1 | | 2/1984 | |

(Continued)

OTHER PUBLICATIONS

Abend, Thomas, "Process and composition for preparing reactive melts based on surface-deactivated solid polyisocyanate and polymers with functional groups", machine translation of EP1386936A1, Apr. 2, 2004.*

(Continued)

*Primary Examiner* — Anish Desai
(74) *Attorney, Agent, or Firm* — Davis & Bujold PLLC; Michael J. Bujold

(57) ABSTRACT

A latent-reactive hot-melt adhesive composition comprising a) at least one first thermoplastic polymer, which is mono-functionally reactive to NCO groups and has a high tensile strength, b) at least one second NCO-reactive polymer and/or oligomer, polymer miscible with the first polymer a), which is at least di-functionally, preferably tri- or multifunctionally, reactive to NCO groups and has a melting temperature ($T_m$), which is lower than the melting temperature (Tm) of polymer a), and is in liquid form, c) at least one solid, (Continued)

Figure 1:
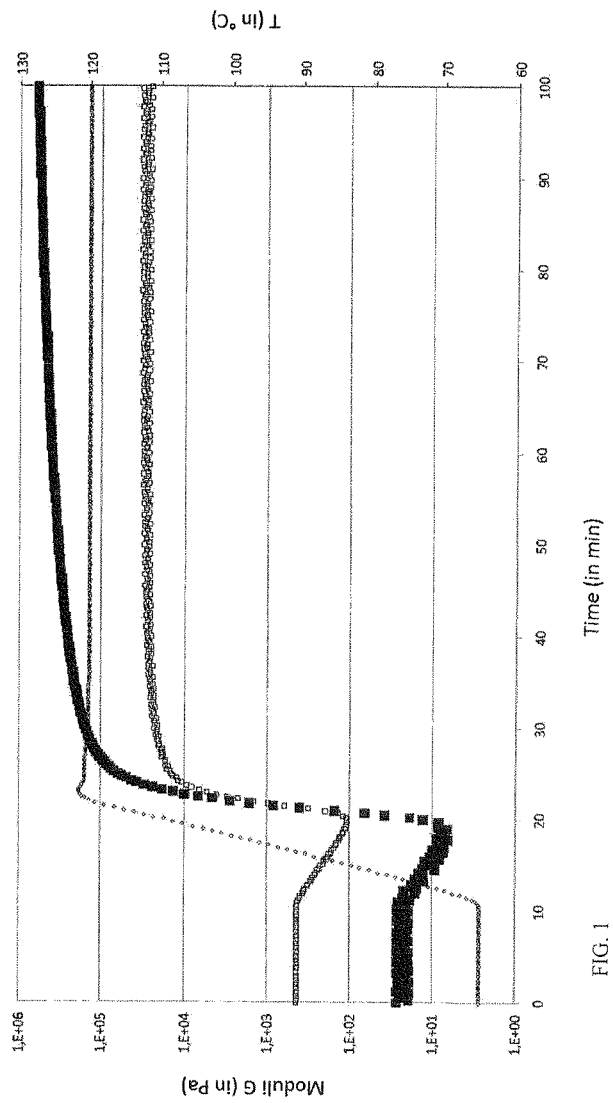

surface deactivated di- and/or polyisocyanate, d) optionally one or more further thermoplastic polymer(s) which does not or do not react to NCO groups. Such compositions have significantly improved mechanical characteristics.

12 Claims, 2 Drawing Sheets

(51) Int. Cl.
    *C08G 18/42*     (2006.01)
    *C08G 18/79*     (2006.01)
    *C08G 18/40*     (2006.01)
    *B29C 47/00*     (2006.01)
    *B29L 7/00*     (2006.01)

(52) U.S. Cl.
    CPC ..... *C08G 18/4277* (2013.01); *C08G 18/5024* (2013.01); *C08G 18/798* (2013.01); *B29L 2007/00* (2013.01); *C08G 2170/20* (2013.01); *Y10T 428/2891* (2015.01)

(56) References Cited

U.S. PATENT DOCUMENTS

| | | | | |
|---|---|---|---|---|
| 5,143,987 | A | * | 9/1992 | Hansel ................ C08G 18/40 525/452 |
| 5,710,215 | A | * | 1/1998 | Abend ................ C08G 18/10 427/398.1 |
| 7,005,482 | B2 | * | 2/2006 | Guse ................ C08G 18/12 156/308.4 |
| 2002/0164486 | A1 | | 11/2002 | Guse et al. |
| 2008/0292902 | A1 | * | 11/2008 | Reid ................ C08G 18/12 428/626 |
| 2009/0110937 | A1 | * | 4/2009 | Onuoha ................ C08G 18/12 428/424.2 |

FOREIGN PATENT DOCUMENTS

| | | |
|---|---|---|
| EP | 0 204 970 B1 | 12/1986 |
| EP | 0598873 A1 | 6/1994 |
| EP | 0 922 720 A1 | 6/1999 |
| EP | 1 231 232 B1 | 8/2002 |
| EP | 1 386 936 A1 | 2/2004 |

OTHER PUBLICATIONS

Tomas, Abend, "Process and Composition for Preparing Reactive Melts Based on Surface-Deactivated Solid Isocyanates and Polymers With Functional Groups", English translation of EP 1386936A1, published on Feb. 4, 2004.*

International Search Report corresponding to PCT/EP2013/068874 dated Nov. 13, 2015.

Written Opinion corresponding to PCT/EP2013/068874 dated Nov. 13, 2015.

* cited by examiner

LATENT-REACTIVE HOT-MELT ADHESIVE COMPOSITION

The present invention relates to a latent-reactive hot-melt adhesive composition based on isocyanate-reactive compounds which is in solid but flexible form at room temperature, can be processed thermoplastically in the temperature range of up to <100° C., and is curable in the range from 100° C. to 160° C. Further described are the use of the adhesive composition of the invention, and a method for the production of latent-reactive hot-melt adhesive granules, and also of a latent-reactive hot-melt adhesive film. The invention further comprises the cured adhesive composition, and adherends or substrates coated with a latent-reactive or cured adhesive composition. One of the characteristics of the composition is that it has sufficient strength to be in solid but not brittle form at temperatures below 40° C. One consequent possibility is that of processing to films which can be cured not until a later point in time, at higher temperatures. Additionally, the composition described possesses particularly advantageous processing characteristics.

Latent-reactive hot-melt adhesives have been known for some time in the prior art. They are notable for being solid and storable at room temperature and curable at higher temperatures.

EP 0 598 973 B1 describes a method for producing reactive hot-melt compositions. They consist of polymer which is solid at room temperature but meltable, and has isocyanate-reactive groups, and of a premix composed of a solid isocyanate and a deactivating agent. The hot-melt composition is applied in layers to carrier materials, so that the deactivated isocyanate layers and the polymer layers are not mixed. These layers can be liquefied and reshaped above 40° C. They cure between 100 and 120° C.

EP 1 386 936 A1 relates to a method and a composition for producing thermosetting hot-melt compositions comprising at least one polymer having isocyanate-reactive groups and at least one surface-deactivated solid isocyanate dispersed into the polymer. The isocyanate-reactive polymer is not formed until directly at the processing stage, as a result of an increase in molecular weight, when a low molecular mass polyol is mixed with free diisocyanate (in a substoichiometric amount).

EP 1 231 232 B1 describes a single-component hot-melt adhesive which is reactive, is solid at room temperature, and comprises an isocyanate which is solid or liquid at room temperature, an isocyanate-reactive polymer and/or resin which is solid at room temperature, and also a non-isocyanate-reactive polymer, resin or wax. This adhesive is non-adhesive at room temperature and becomes adherent only on heating to temperatures between 60° C. and 160° C.

A disadvantage of the known compositions lies in their relatively disadvantageous processing characteristics and in their brittle consistency in the uncured state. When substrates have been coated with these compositions, a frequent occurrence even prior to curing, as a result of temperature increase, is an extensive flaking of the coating from the substrate surface. As a result of their brittleness, it is not even possible to produce films based on these compositions at all.

The object of the present invention, accordingly, lies in providing a new, latent-reactive hot-melt adhesive composition which possesses the advantageous characteristics of known latent-reactive hot-melt adhesive compositions and which does not have their disadvantageous characteristics. The adhesive composition of the invention ought in particular to possess improved mechanical characteristics.

Accordingly, below its melting temperature, it should be tough but still flexible, not brittle, not tacky (free from blocking), and non-bleeding. These qualities allow the composition, among other things, to be extruded as a film, and make it possible among other things to prevent initial coatings of the composition on substrates from flaking off again.

More particularly it is an object of the invention to provide a latent-reactive hot-melt adhesive having improved processing characteristics as a premix. In the cured state, the composition is to exhibit chemical resistance, low creep, resilience, and improved thermal holdout.

The object according to the invention is achieved through providing of a latent-reactive hot-melt adhesive composition according to claim 1.

This latent-reactive hot-melt adhesive composition comprises a) at least one first thermoplastic polymer which is at least monofunctionally reactive toward NCO groups and has a tensile strength of $\sigma_M \geq 4$ MPa to 30 MPa as measured to EN ISO 527-1:1996 and an elongation at break of $\epsilon_B \geq 5\%$ to 1000% as measured to EN ISO 527-1:1996, b) at least one second NCO-reactive polymer and/or oligomer which is at least di-functionally, preferably tri- or multifunctionally, reactive toward NCO groups and possesses a melting temperature $T_m$ which is lower than the melting temperature $T_m$ of polymer a) and which is in liquid form in particular at 40° C., preferably at 30° C., very preferably at 20° C., c) at least one solid, surface-deactivated di- or polyisocyanate, d) optionally: one or more thermoplastic polymer (s) which do not react with NCO groups.

The first thermoplastic polymer of component a) is present in the latent-reactive hot-melt adhesive composition of the invention at not less than 20 wt %, preferably at not less than 50 wt %, more preferably at not less than 60 wt %. It has a melting temperature $T_m$ of <100° C., preferably <70° C., and more particularly it has thermoplastic characteristics below the reaction temperature of >70° C. to 160° C. at which the latent-reactive composition cures.

Component a) has an average molecular weight $M_w \geq 25\,000$ g/mol to 100 000 g/mol. The at least one NCO-reactive group per molecule may be a hydroxyl group or amine group and is preferably a hydroxyl group. The hydroxyl number of component a) in this case is in the range from 1 to 15 [mg KOH/g], preferably in the range from 1 to 10 [mg KOH/g]. The method for determining the hydroxyl number is carried out according to DIN 53240.

Component a) has a high tensile strength of $\sigma_M \geq 4$ MPa to 30 MPa, more particularly $\geq 10$ MPa, and an elongation at break of $\epsilon_B \geq 5\%$ to 1000%, both properties being measured to EN ISO 527-1:1996 with a 1BA specimen as defined in ISO EN 527-2:1996.

More particularly component a) is a linear polycaprolactone and/or a linear polycaprolactone polyurethane prepolymer.

The second polymer of component b) is preferably an NCO-reactive polymer that is compatible with component a).

In the latent-reactive hot-melt adhesive composition of the invention, component b) is present at 5 to 40 wt %, preferably in the range from 10 wt % to 25 wt %. The at least two, preferably three or more, NCO-reactive functionalities per molecule of component b) may be hydroxyl groups or amino groups. The hydroxyl number of component b) is in the range between 25 and 2000 [mg KOH/g]. The method for determining the hydroxyl number is carried out according to DIN 53240.

Polymer or oligomer b) possesses a melting temperature $T_m$ which is lower than the melting temperature $T_m$ of polymer a). At 40° C., preferably at 30° C., more preferably at 20° C., polymer or oligomer b) is in liquid form. The average molecular weight $M_w$ of component b) is less than or equal to 4000 g/mol. More particularly component b) is a polycaprolactone, as for example poly-ε-caprolactone, polyester, copolyester, polyether, copolyether and/or a polycarbonate.

Component c) of the latent-reactive hot-melt adhesive composition of the invention is a surface-deactivated, aliphatic and/or aromatic di- and/or polyisocyanate in powder form, which is present in the composition in an amount in the range from 5 to 25 wt %.

Possible di- and polyisocyanates include dimeric 2,4-toluene diisocyanate and its derivatives, 1,5-diisocyanatonaphthalene, diisocyanatotolueneureas, 1-isocyanato-3-isocyanatomethyl-3,5,5-trimethylcyclohexane isocyanurate, 3,3'-dimethylbiphenyl 4,4'-diisocyanate, 3,3'-diisocyanato-4,4'-dimethyl-N,N-diphenylurea, diphenylmethane 2,2'-diisocyanate dimer, diphenylmethane 2,4'-diisocyanate dimer, diphenylmethane 4,4'-diisocyanate dimer and also mixtures, uretdione dimers, urea dimers, trimers, and prepolymers of the aforesaid compounds.

The isocyanate used is to have a melting temperature of $T_m > 70°$ C., preferably of $\geq 100°$ C., more preferably of $\geq 110°$ C.

The surface deactivation of the NCO groups of the isocyanates may take place through the addition of one or more deactivating agents which react with NCO groups to give the di- or polyisocyanate(s). The deactivating agent is first dissolved in the liquid component b), followed by isocyanate. Alternatively it is also possible for all the components to be placed simultaneously into an extruder and mixed with one another. Deactivating agents used are preferably compounds having NCO-reactive groups such as hydroxyl groups or amino groups, such as, for example, amines, diamines, polyamines, alcohols, diols, polyols, and the corresponding thio compounds, which react with free NCO groups and form a surface shell on the isocyanate.

Deactivating agents are known to the skilled person from the prior art DE 32 30 717 A1, EP 0 204 970 A2, and EP 0 922 720 A1. Used preferably in the composition of the invention is isocyanate deactivated with trifunctional polyetheramine.

Component d), which may be included optionally in the latent-reactive hot-melt adhesive composition of the invention, is one or more thermoplastic polymers which do not react with NCO groups and which are present in the composition in particular from 0 up to 10 wt %. Here it is possible to add resins such as, for example, hydrocarbon resins, waxes, polyolefins, or ethyl/vinyl acetate-based polymers and copolymers.

The latent-reactive adhesive composition may comprise all components a) to d), each present in an amount selected from the wt % ranges specified above.

Furthermore, the latent-reactive hot-melt adhesive composition of the invention may also comprise one or more catalysts, such as, for example, dibutyltin dilaurate (DBTL), 1,4-diazobicyclo[2.2.2]octane (DABCO), or tri-ethylamine. In addition there may also be other catalysts used, known as catalysts for polyurethane chemistry to the skilled person. The amount used is in this case preferably in a range from 0.05 to 5 wt % of the mixture.

Latent-reactive in this context denotes the fact that the hot-melt adhesive composition comprising components a) to d) is present at room temperature, i.e., more particularly, at temperatures between 20° C. and 40° C., as a solid, advantageously non-adhesive composition. Heating of the composition to temperatures above 40° C. and below 100° C. causes it to become thermoplastically processible and to be able to be processed as granules or extruded as a film. Above the melting point of the surface-deactivated isocyanate (depending on the particular isocyanate, for example, above 70° C., preferably above 100° C., more preferably above 110° C.), the liberation of the isocyanates can begin, and so they can then react with the NCO-reactive groups that are present in the composition, and lead to the crosslinking of the polymers—that is, to the permanent, irreversible curing of the adhesive composition.

Proving particularly advantageous in the processing of the individual components with one another is the use of the liquid component b). This component allows the preparation of a premix from the sold isocyanate c) and the liquid component b), which has a low molecular weight and, in association therewith, a low viscosity and a low melting temperature. This makes it possible for the isocyanate to be easily incorporated into the mixture of the other components a) and optionally b) and/or d) below a temperature of 70° C., without reaction of the individual components with one another—which would lead to the curing of the reaction mixture—taking place at this stage. It is surprising, moreover, that the liquid component b) can be incorporated, but does not bleed out and advantageously does not make the formulation tacky at room temperature.

Furthermore, surprisingly, in the formulating of the latent-reactive hot-melt adhesive composition of the invention, it has been found that through the combination of the above-described component a), i.e., of the NCO-reactive, high-strength polymer, with a second, liquid NCO-reactive polymer of component b), an adhesive composition is obtained which has significantly improved mechanical characteristics.

As a result of the elevated strength of component a), the resulting composition is non-brittle, tear-resistant, and elastic, and can be processed to films. These films have a thickness of 10 to 1000 μm, preferably of 20 to 500 μm, more preferably of 40 to 200 μm.

The liquid component b) is branched, short-chain, and more highly functionalized with NCO-reactive groups per unit mass than is component a). Its effect is that for the same amount of isocyanate, the less-functionalized carrier polymer a) with good strength can be used and leads at the same time to improved melting and flow characteristics. In the latent-reactive state, the adhesive matrix exhibits a storability of the composition of several months at 20° C. and a storage stability of 4 to 12 hours at 60 to 65° C. without chemical changes. In the cored state, the effect of the polymers or oligomers of component b) is an increased crosslinking density, and also an improved thermal holdout of more than 140° C. up to more than 170° C. for the composition, higher chemical resistance, toughness, and improved creep behavior.

The invention further encompasses an adhesive composition in the cured state. This composition is obtainable by heating the above-described latent-reactive hot-melt adhesive composition to a temperature of >70° C. to 150° C., preferably to 110° C. to 120° C. Above the temperatures of 70° C., preferably 100° C., more preferably 110° C., the isocyanates used in accordance with the invention are liberated, and components a) and b) react with them. The components of the latent-reactive composition undergo crosslinking.

Also embraced by the invention is a method for producing latent-reactive hot-melt adhesive granules, comprising
  i) mixing one or more isocyanates with one or more deactivating agents and optionally with component b) of the above-described latent-reactive hot-melt adhesive composition,
  ii) mixing the mixture obtained in method step i) with component a) and optionally with components b) and/or d) of the above-described latent-reactive hot-melt adhesive composition in a mixing device at a temperature in the range from ≥40° C. to 100° C., preferably 50° C. to 70° C.,
  iii) extruding the mixture obtained as per step ii), as a strand, and
  iv) granulating the strand.

Method step ii) is carried out by introducing a mixture of the reaction mixture from step i) and optionally of components b) and/or d) into an extruder heated at ≥50° C. to 70° C., followed by component a), and mixing these constituents. The latent-reactive adhesive composition formed accordingly is extruded as a strand through a die in step iii) of the method, and is subsequently cooled and divided up by means of a rotating knife into sections, which constitute the granules.

These granules are stable on storage for several months at 20° C. and can be further processed thermoplastically, subsequently or at a later point in time.

A second, variant method relates to the production of a latent-reactive hot-melt adhesive film, comprising the following method steps:
  i) mixing one or more isocyanates with one or more deactivating agents and optionally with component b) of the above-described latent-reactive hot-melt adhesive composition,
  ii) mixing the mixture obtained in method step i) with component a) and optionally with components b) and/or d) of the above-described latent-reactive hot-melt adhesive composition in a mixing device at a temperature in the range from a ≥40° C. to 100° C., preferably 50° C. to 70° C.,
  iii) extruding or rolling out either the mixture obtained in step ii), or granules as obtained by the above-elucidated method, as a film.

This method for the production of a hot-melt adhesive film comprises method steps i) and ii), which correspond to method steps i) and ii) in the production of hot-melt adhesive granules. In step iii), instead of a die for strand extrusion, a flat slot die or a curved die is used, and the mixture is extruded through it. Further processing after extrusion by means of a blown film process is likewise possible.

Furthermore described is the use of the above-described latent-reactive hot-melt adhesive composition for producing latent-reactive hot-melt adhesive granules and a latent-reactive hot-melt adhesive film, both produced in accordance with the variant methods described above.

A further aspect of the invention is a coated substrate or adherend which comprises either the above-described latent-reactive hot-melt adhesive composition or the likewise above-described cured adhesive composition.

Figure 2:
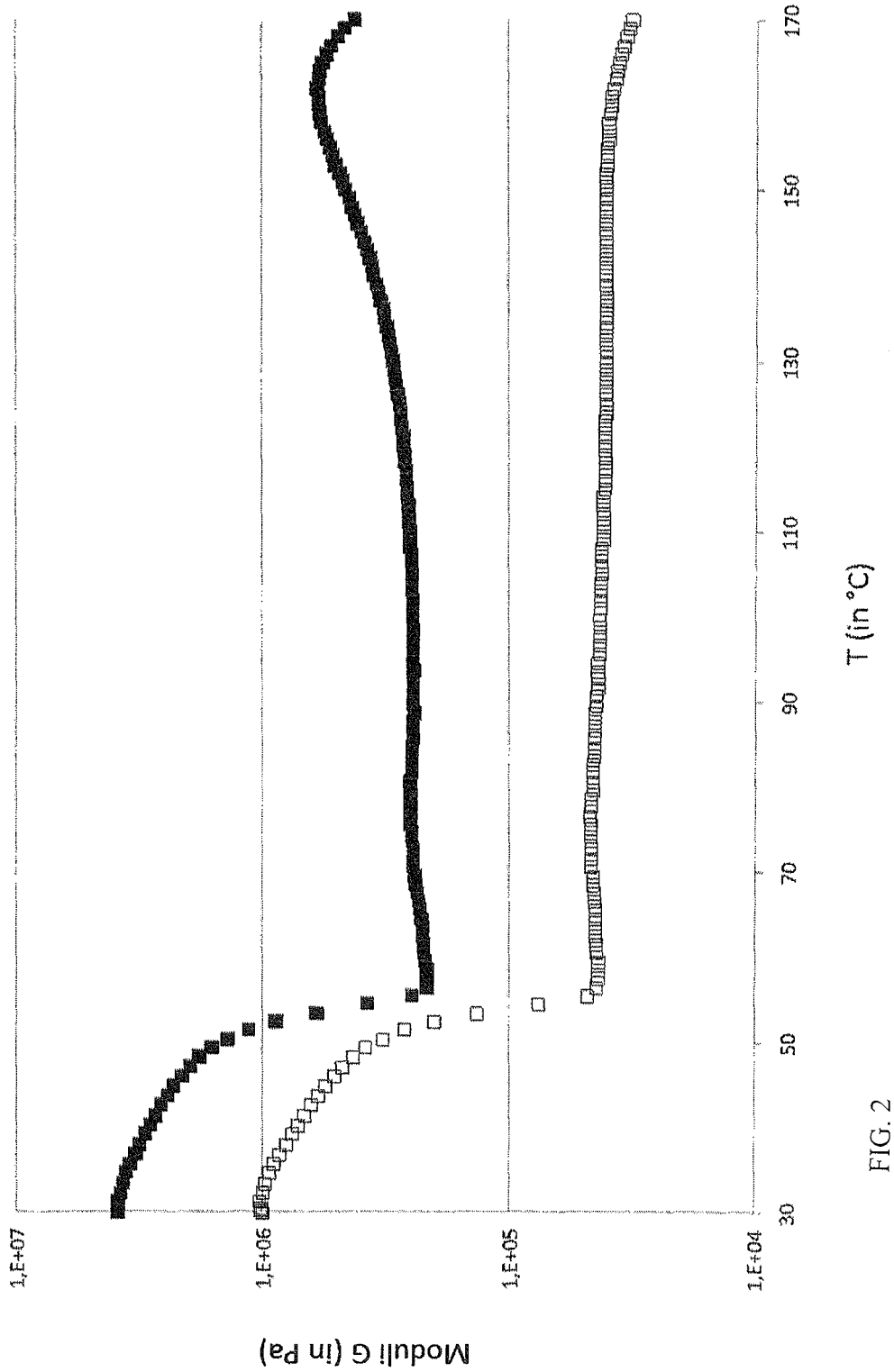

The invention is elucidated below using working examples and comparative examples and also figures, without the subject matter of the invention being confined to the embodiments shown. The subjects of the figures are as follows:

FIG. 1: Rheological plot for the curing of an inventive composition;
FIG. 2: Plot of the rheological thermal holdout investigation on an inventive composition.

FIG. 1 shows a graph of the results of a rheological experiment on the curing of an inventive latent-reactive hot-melt adhesive composition according to working example 1.

The y-axis drawn on the right-hand side of the graph indicates the temperature level in ° C. and pertains to the temperature plot (represented by circular dots). The x-axis represents the time in minutes. Indicated on the y-axis drawn on the left are the measurements for moduli in Pa. These are represented by the plots for the change in storage modulus G' (dark, square dots) and for the change in loss modulus G" (pale, square dots).

If the loss modulus G" is greater than the storage modulus G', the inventive hot-melt adhesive undergoes flow. In the present experiment, this is the case up to a temperature of about 120° C. At this temperature, both curves rise steeply after about 30 minutes, with that of the storage modulus G' intersecting that of the loss modulus G". At this point, the hot-melt adhesive composition cures and changes from the liquid to the solid state.

FIG. 2 shows the graph of a rheological thermal holdout investigation on an inventive hot-melt adhesive composition according to working example 1 in latent-reactive state and cured state over a temperature range from 30° C. to 170° C. The graph shows a loss modulus plot G" (white squares) and a storage modulus plot G' (black squares), and indicates the temperature in ° C. on its x-axis and the modulus in Pa on the y-axis.

COMPARATIVE EXAMPLE

Example 1 from patent specification EP 1 231 232 B1 on the production of a latent-reactive hot-melt adhesive composition was emulated using the hydrocarbon resin Novares® TM90 instead of the TM80 specified in example 1 (no longer available commercially), which has a softening point 10° C. higher, and mixing took place in a Speedmixer.

Data on the tensile strength and elongation at break of this composition are contained in table 3.

Example 1

A trifunctional polyetheramine (Jeffamine T403 from Huntsman, 0.14 g) was melted with a trifunctional, liquid polycaprolactone (CAPA 3091 from Perstorp, 2 g) and with a thermoplastic polyol (CAPA 6250 from Perstorp, 8 g) and dibutyltin dilaurate (Sigma-Aldrich, 0.012 g) in a heating cabinet at 80° C. for 30 minutes. The resulting composition was subsequently mixed for 30 seconds in a Speedmixer at maximum revolution speed. Following addition of a dimeric 2,4-toluene diisocyanate (Addolink TT from Rheinchemie, 1.405 g), the mixture was mixed for a further 90 seconds.

The mixture thus obtained can be coated out and can be rolled up without problems after it has cooled, even without a carrier film. The mixture can be cored at 120° C.

Example 2

2.1 Preparation of Reaction Mixture 1:

A liquid polyol (CAPA 3091 from Perstorp, 1035 g) in a 5 L metal pail was admixed with a trifunctional polyetheramine (Jeffamine T403 from Huntsman, 76 g). After brief mixing with a glass rod, a dimeric 2,4-toluene diisocyanate (Addolink TT from Rheinchemie, 748 g) was added. The mixture was suspended in a dissolver for one minute. Then a catalyst (dibutyltin dilaurate from Sigma-Aldrich, 6 g) was added and the mixture was suspended for three minutes.

The resulting reaction mixture 1 can be stored at room temperature for several weeks.

2.2 Production of Latent-Reactive Granules (LRG) from Reaction Mixture 1:

The LRG were produced using a twin-screw extruder. Reaction mixture 1 (32 wt %) was conveyed into the twin-screw extruder, which had heated to a temperature of 60° C., through a charging hopper heated at 50° C. A thermoplastic polyol (CAPA 6250 from Perstorp, 68 wt %) was added and was kneaded with reaction mixture 1. The resulting strand of mixture 1 was cooled in a water/ice bath and then granulated.

The resulting LPG are stable on storage at room temperature for several months and can be processed further thermoplastically.

2.3 Production of a Latent-Reactive Film (LRF) from Reaction Mixture 1:

Reaction mixture 1 was produced as described above. At 32 wt %, it was placed into the twin-screw extruder for the production of LRG with a thermoplastic polyol (68 wt %; CAPA 6250 from Perstorp). The apparatus was equipped with a flat slot die through which the completed mixture was passed and was deposited on a carrier film.

2.4 Production of a Latent-Reactive Film (LRF) from Latent-Reactive Granules (LRG):

Latent-reactive granules (LPG) were placed into a single-screw extruder and passed at 60° C. through a flat slot die and deposited on a carrier film.

The resulting latent-reactive film (LRF) is flexible and can be stored for several months. As and when required, it can be induced to adhesive bonding by means of a temperature pulse of at least 120° C.

Alternatively, LRG can also be melted in an oven and applied to a substrate by means of a roller application system (e.g., a Hardo roller application system) as a film. It is also possible to melt LRG in the roller application system itself.

2.5 Production of Hot-Melt Adhesive Compositions with Reaction Mixture 1 and Polymers with Different Tensile Strengths a Component a):

Table 1 shows examples of polymers used as component a) together with reaction mixture 1 to produce a flexible hot-melt adhesive film, and also shows the characteristics of these polymers in terms of molecular weight, functionalization with hydroxyl groups, and tensile strength.

TABLE 1

| Trade name of polymer | Molecular weight MW | Hydroxyl number [mm KOH/g] | Tensile strength [MPa] | Elongation at break [%] | Mixture with reaction mixture 1 | |
|---|---|---|---|---|---|---|
| | | | | | Tensile strength [MPa] | Elongation at break [%] |
| PEARLBOND DIPP-539 (linear thermoplastic polyurethane) | 30 000* | <5* | 14 | 90 | 5 | 12 |
| CAPA6250 | 25'000* | 5* | 14 | 660* | 8 | 9 |
| CAPA2100# (linear polyester diol) | 1000* | 112* | not measurable | not measurable | not measurable | not measurable |
| CAPA2402# (linear polyester diol) | 4000* | 28* | <4 MPa | <5% | <1 MPa | <1% |
| BAYCOLL AD 5027# (linear polyester diol) | 4000* | 28 ± 5* | <4 MPa | <5% | <1 MPa | <1% |
| DYNACOLL 7360# (linear copolyester) | 3500 | 27-34* | <4 MPa | <5% | <1 MPa | <1% |

*Manufacturer data
Noninventive composition

Example 3

Production of a Deactivating Mixture A:

A liquid polyol (Capa 3091 from Perstorp, 172 g), a polyetheramine (Jeffamine T 403 from Huntsman, 13 g), and dibutyltin dilaurate (Sigma-Aldrich, 1 g) were mixed using a glass rod.

Production of an LRF:

A twin-screw extruder was used which was fitted with a powder and granule metering means. The twin-screw extruder further comprises a liquid metering facility.

A thermoplastic polyol (Capa 6250 from Perstorp, 690 g/h) and dimeric 2,4-toluene diisocyanate (Addolink TT from Rheinchemie, 125 g/h) were introduced into the twin-screw extruder.

Deactivating mixture A (185 g/h) was added. Strand takeoff and granulation were applied to produce granules. Where a flat slot die was used, a latent-reactive film (LRF) was produced.

The films produced in this way can be stored stably at room temperature for several months. The product can be bonded, i.e., cured, by means of a heating press at 100 to 150° C. (preferably at 110 to 120° C.).

Experiments with Different Compositions to Determine the Tensile Strength:

The tensile strength of a specimen of a hot-melt adhesive composition of example 1 was measured by means of a Zwick Roell Z005 TN tensile testing device at a testing rate of 50 mm/min in accordance with the standard EN ISO 527-2:1996, using the 1BA specimen type, produced by punching from a plate, and was found to have a value of >4 MPa.

An overview of the compositions investigated and of the results is shown in table 2.

TABLE 2

| Composition | Product produced | Tensile strength [MPa] | Elongation at break [%] |
|---|---|---|---|
| Latent-reactive film/inventive granules | production of specimen by melting, pressing and punching | >4 | >9 |
| HCM 555 G (heat-reactive, polyester based, polyurethane adhesive) (Collano Group) | brittle specimen | <4 | <2 |
| LAREAS (heat-reactive, polyester based, polyurethane adhesive) (Collano Group) | brittle specimen | <4 | <2 |
| Ex. 11 from EP 1 433 802 A1 | brittle specimen | <4 | <2 |
| Ex. 12 from EP 1 433 802 A1 | brittle specimen | <4 | <2 |
| Ex. 1 from EP 1 231 232 B1 | brittle specimen | <4 | <2 |

Rheological Investigation on the Curing of the Inventive Latent-Reactive Hot-Melt Adhesive Composition:

A rheological experiment on the curing of an inventive latent-reactive hot-melt adhesive composition from example 1 was carried out by means of a rheometer (Anton Paar MCR 301), with an amplitude of Y=1%, a circular frequency=1 rad/s, and a heating rate of 5 K/min from 65° C. to 120° C.

Up to a temperature of below 80° C., the loss modulus G" had a value of approximately $10^3$ Pa, and rose to >$10^4$ Pa when the temperature subsequently increased to 120° C.

Up to a temperature <120° C. the storage modulus G' was at a level of >$10^1$ Pa below that of the loss modulus G", i.e., the inventive composition was it, the liquid or deformable state. At 120° C. there was an increase in G' to >$10^5$ Pa. Accordingly, the value of G' exceeded that of G", meaning that the composition underwent transition to the solid state at about 120° C.

Rheological Thermal Holdout Investigation on the Inventive Hot-Melt Adhesive Composition:

Cured samples of an inventive composition from working example 1 were investigated in a rheometer (Anton Paar MCR 301; plate/plate), with an amplitude of Y=1%, a frequency of f=1 Hz, a heating rate of 2° C./min over a temperature range from 30° C. to 170° C.

When the values (in Pa) for the storage modulus and the loss modulus of the inventive composition, G' and G", respectively, fell up to a temperature of about 60° C., their respective values >60° C. to 170° C. remained largely constant at >$10^4$ Pa and >$10^5$ Pa, respectively. This indicates temperature stability on the part of the cured composition in the range from >60° C. to 170° C.

The invention claimed is:

1. A latent-reactive hot-melt adhesive composition comprising:
    a) at least one first thermoplastic polymer which is monofunctionally reactive toward NCO groups and has a tensile strength of $\sigma_M \geq 4$ MPa up to 30 MPa as measured according to EN ISO 527-1:1996 and an elongation at break of $\epsilon_B \geq 5\%$ up to 1000% as measured according to EN ISO 527-1:1996,
    b) at least one second NCO-reactive polymer and/or oligomer which is at least di-functionally reactive toward NCO groups and possesses a melting temperature $T_m$ which is lower than the melting temperature $T_m$ of the at least one first thermoplastic polymer and which is in liquid form at 40° C.,
    c) at least one solid, surface-deactivated di- and/or polyisocyanate,
    d) optionally one or more further thermoplastic polymers which do not react with NCO groups.

2. The latent-reactive hot-melt adhesive composition according to claim 1, wherein
    a) the at least one first thermoplastic polymer is present at not less than 20 wt %;
    b) the at least one second NCO-reactive polymer and/or oligomer is present at from 5 to 40 wt %;
    c) the at least one solid, surface deactivated di- and/or polyisocyanate is present at 5 to 25 wt %; and
    optionally d) the one or more further thermoplastic polymer(s) is/are present at 0 to 10 wt %.

3. The latent-reactive hot-melt adhesive composition according to claim 1, wherein the thermoplastic polymer a) has a melting temperature of $T_m<100°$ C.

4. The latent-reactive hot-melt adhesive composition according to claim 1, wherein the di- or polyisocyanate c) has a melting temperature of $T_m>70°$ C.

5. The latent-reactive hot-melt adhesive composition according to claim 1, wherein the at least one solid, surface-deactivated di- and/or polyisocyanate is obtainable by the addition to the di- or polyisocyanate of one or more deactivating agents which react with NCO groups.

6. The latent-reactive hot-melt adhesive composition according to claim 1, in which the latent-reactive hot-melt adhesive composition is curable in the temperature range from >70 up to 160° C.

7. The latent-reactive hot-melt adhesive composition according to claim 1, wherein the at least one first thermoplastic polymer a) has an average molecular weight $M_w \geq 25\ 000$ g/mol up to 100 000 g/mol.

8. The latent-reactive hot-melt adhesive composition according to claim 1, wherein the at least one second NCO-reactive polymer or oligomer b) is a polycaprolactone, polyester, copolyester, polyether, copolyether and/or a polycarbonate having an average molecular weight $M_w \geq 4000$ g/mol.

9. The latent-reactive hot-melt adhesive composition according to claim 1, wherein the di- and/or polyisocyanate is selected from the group consisting of dimeric 2,4-toluene diisocyanate, 1,5-diisocyanatonaphthalene, diisocyanatotolueneureas, 1-isocyanato-3-isocyanatomethyl-3,5,5-trimethylcyclohexane isocyanurate, 3,3'-dimethylbiphenyl 4,4'-diisocyanate, 3,3'-diisocyanato-4,4'-dimethyl-N,N-diphenylurea, diphenylmethane 2,2'-diisocyanate dimer, diphenylmethane 2,4'-diisocyanate dimer, diphenylmethane 4,4'-diisocyanate dimer and mixtures, and uretdione dimers.

10. The latent-reactive hot melt adhesive composition according to claim 1, wherein the adhesive includes the one or more further thermoplastic polymers which do not react with NCO groups.

11. An adhesive composition obtained by heating the latent-reactive hot-melt adhesive composition, according to claim 1, to a temperature of >70° C. up to 160° C.

12. A coated substrate or adherend comprising a latent-reactive hot-melt adhesive composition comprising:

a) at least one first thermoplastic polymer which is monofunctionally reactive toward NCO groups and has a tensile strength of $\sigma_M \geq 4$ MPa up to 30 MPa as measured according to EN ISO 527-1:1996 and an elongation at break of $\epsilon_B \geq 5\%$ up to 1000% as measured according to EN ISO 527-1:1996, b) at least one second NCO-reactive polymer and/or oligomer which is at least di-functionally reactive toward NCO groups and possesses a melting temperature $T_m$ which is lower than the melting temperature $T_m$ of the at least one first thermoplastic polymer and which is in liquid form at 40° C., c) at least one solid, surface-deactivated di- and/or polyisocyanate, d) optionally one or more further thermoplastic polymer(s) which does or do not react with NCO groups.

* * * * *